United States Patent
Pinarbasi (10) Patent No.: US 6,219,210 B1
(45) Date of Patent: Apr. 17, 2001

(54) SPIN VALVE SENSOR WITH NICKEL OXIDE PINNING LAYER ON A CHROMIUM SEED LAYER

(75) Inventor: Mustafa Pinarbasi, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/364,587

(22) Filed: Jul. 30, 1999

(51) Int. Cl.$^7$ ........................................... G11B 5/39
(52) U.S. Cl. ............................................. 360/324.11
(58) Field of Search .................... 360/324.1, 324.11, 360/317

(56) References Cited

U.S. PATENT DOCUMENTS

| | | | |
|---|---|---|---|
| 5,326,429 | 7/1994 | Cohen et al. | 156/655 |
| 5,591,533 | 1/1997 | Pinarbasi | 428/611 |
| 5,650,897 | 7/1997 | Cohen et al. | 360/126 |
| 5,657,192 | 8/1997 | Cohen et al. | 360/126 |
| 5,659,451 | 8/1997 | Cohen et al. | 360/126 |
| 5,696,654 | 12/1997 | Gill et al. | 360/113 |
| 5,701,223 | 12/1997 | Fontana, Jr. et al. | 360/113 |
| 5,731,936 | 3/1998 | Lee et al. | 360/113 |
| 5,811,155 | 9/1998 | Pinarbasi | 427/131 |
| 5,820,770 | 10/1998 | Cohen et al. | 216/22 |
| 5,883,764 | * 3/1999 | Pinarbasi | 360/113 |
| 6,055,136 | * 4/2000 | Gill et al. | 360/113 |
| 6,063,491 | * 5/2000 | Fujikata et al. | 428/332 |
| 6,141,191 | * 10/2000 | Lee et al. | 360/324.1 |

* cited by examiner

*Primary Examiner*—Jefferson Evans
(74) *Attorney, Agent, or Firm*—Gray Cary Ware & Freidenrich; Ervin F. Johnston (57) ABSTRACT

A seed layer is located between a first read gap layer and a nickel oxide (NiO) pinning layer for improving the microstructure of the pinning layer. The improved microstructure of the pinning layer increases an exchange coupling between the pinning layer and a ferromagnetic pinned layer structure which improves the magnetoresistive coefficient (dr/R) of a spin valve sensor. The seed layer is chromium (Cr), chromium oxide ($Cr_2O_3$) or an alloy thereof with a preferred seed layer being chromium (Cr) with a thickness less than 50 Å. In another embodiment an additional seed layer of tantalum (Ta) may be employed between the chromium (Cr) seed layer and the first read gap layer for further enhancement of the magnetoresistive coefficient (dr/R).

30 Claims, 11 Drawing Sheets

FIG. 11
(ABS)

SPIN VALVE SENSOR WITH NICKEL OXIDE PINNING LAYER ON A CHROMIUM SEED LAYER

BACKGROUND OF THE INVENTION

1. Field of the Invention

The present invention relates to a spin valve sensor with a nickel oxide (NiO) pinning layer on a chromium based seed layer and more particularly to a chromium seed layer that improves an exchange coupling between the pinning layer and a pinned layer of the sensor.

2. Description of the Related Art

A spin valve sensor is employed by a read head for sensing magnetic fields on a moving magnetic medium, such as a rotating magnetic disk. The sensor includes a nonmagnetic electrically conductive first spacer layer sandwiched between a ferromagnetic pinned layer and a ferromagnetic free layer. An antiferromagnetic pinning layer is exchange coupled to the pinned layer for pinning the magnetic moment of the pinned layer 90° to an air bearing surface (ABS) which is an exposed surface of the sensor that faces the magnetic disk. First and second leads are connected to the spin valve sensor for conducting a sense current therethrough. The magnetic moment of the free layer is free to rotate upwardly or downwardly with respect to the ABS from a quiescent or bias point position in response to positive and negative magnetic field signals from a rotating magnetic disk. The quiescent position, which is typically parallel to the ABS, is the position of the magnetic moment of the free layer with the sense current conducted through the sensor in the absence of signal fields.

The thickness of the spacer layer is chosen so that shunting of the sense current and a magnetic coupling between the free and pinned layers are minimized. This thickness is typically less than the mean free path of electrons conducted through the sensor. With this arrangement, a portion of the conduction electrons are scattered at the interfaces of the spacer layer with respect to the pinned and free layers. Changes in scattering changes the resistance of the spin valve sensor as a function of $\cos \theta$, where $\theta$ is the angle between the magnetic moments of the pinned and free layers. When the magnetic moments of the pinned and free layers are parallel with respect to one another scattering is minimal and when their magnetic moments are antiparallel scattering is maximized. The sensitivity of the sensor is quantified as magnetoresistive coefficient dr/R where dr is the change in resistance of the sensor from a minimum resistance, where the magnetic moments of the free and pinned layer are parallel, to a maximum resistance, where the magnetic moments are antiparallel, and R is the resistance of the sensor before the change.

Over the years a significant amount of research has been conducted to improve the magnetoresistive coefficient dr/R (also referred to as GMR) of spin valve sensors. These efforts have increased the storage capacity of computers from kilobytes to megabytes to gigabytes. Some of these efforts have been directed to the type of material and thicknesses of the various layers of the spin valve sensor which is an effort of the present invention.

SUMMARY OF THE INVENTION

The present invention provides a novel seed layer for the aforementioned pinning layer of the spin valve sensor. The seed layer increases the magnetoresistive coefficient dr/R of the spin valve sensor which, in turn, increases the storage capacity. The seed layer is chromium based and may be chromium (Cr), chromium oxide ($Cr_2O_3$) or alloys thereof. In a spin valve sensor without the seed layer I found the magnetoresistive coefficient dr/R to be 5.28% while in the same spin valve sensor with a 35 Å thick chromium seed layer I found the magnetoresistive coefficient dr/R to be 5.90%. Accordingly, the seed layer produced a 12% increase in the magnetoresistive coefficient dr/R. This was caused by an improved exchange coupling field between the pinning and pinned layers. It is believed that the seed layer improved the microstructure of the pinning layer which, in turn, lead to the improvement of the exchange coupling between the pinning and pinned layers.

An object of the present invention is to provide a spin valve sensor with an improved magnetoresistive coefficient dr/R.

Another object is to provide a seed layer for a pinning layer that improves an exchange coupling field between the pinning layer and a pinned layer of a spin valve sensor.

Other objects and attendant advantages of the invention will be appreciated upon reading the following description taken together with the accompanying drawings.

DESCRIPTION OF THE PREFERRED EMBODIMENTS

Magnetic Disk Drive

Figure 1:
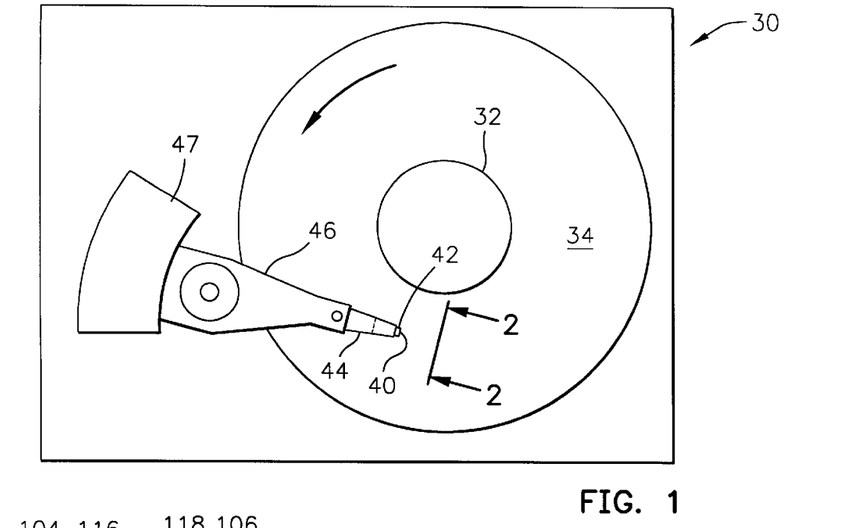
FIG. 1 is a planar view of an exemplary magnetic disk drive.
Figure 2:
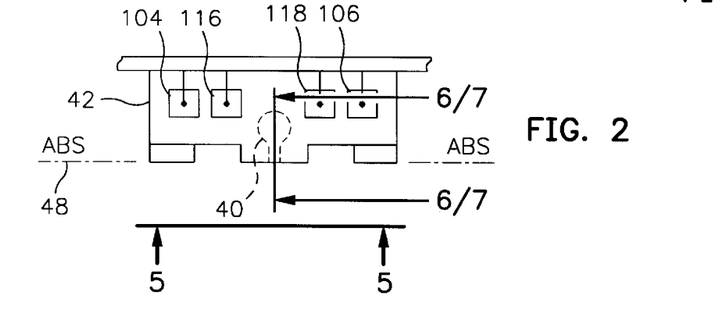
FIG. 2 is an end view of a slider with a magnetic head of the disk drive as seen in plane 2—2.
Figure 3:
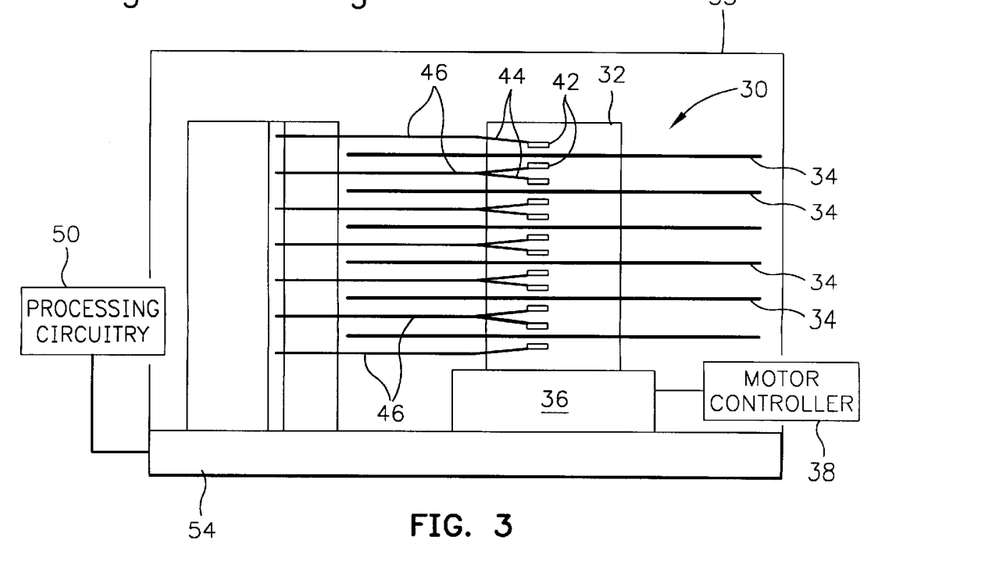
FIG. 3 is an elevation view of the magnetic disk drive wherein multiple disks and magnetic heads are employed.
Figure 4:
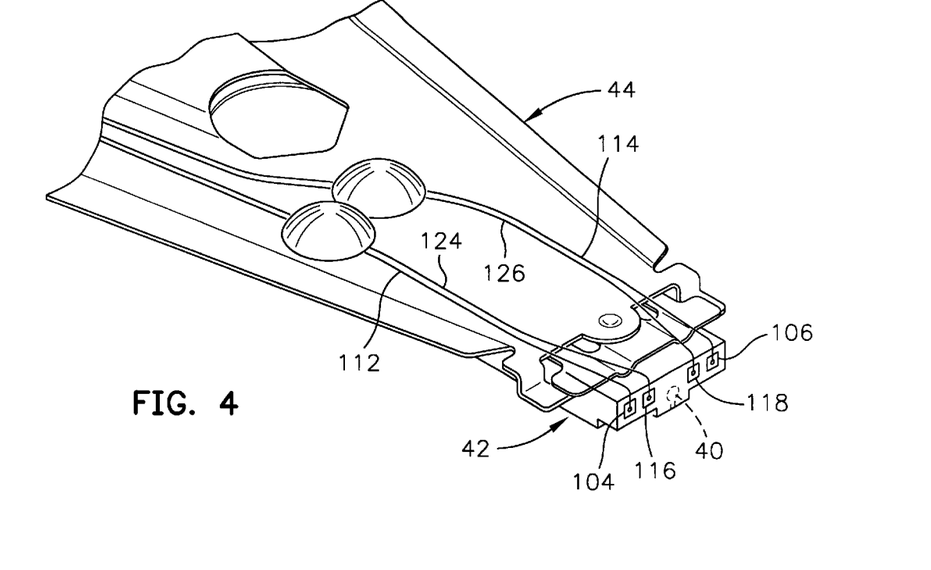
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A combined read and write magnetic head 40 is mounted on a slider 42 that is supported by a suspension 44 and actuator arm 46 that is rotatably positioned by the actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 μm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator 47 for moving the slider to various tracks. In FIG. 4 the slider 42 is shown mounted to a suspension 44. The components described hereinabove may be mounted on a frame 54 of a housing 55, as shown in FIG. 3.

Figure 5:
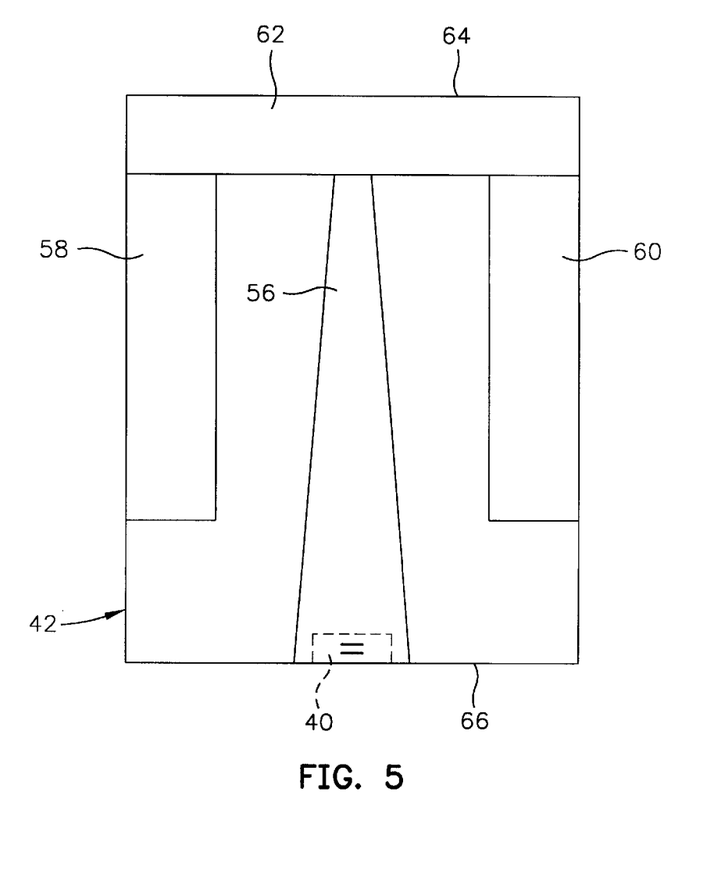
FIG. 5 is an ABS view of the slider taken along plane 5—5 of FIG. 2.

FIG. 5 is an ABS view of the slider 42 and the magnetic head 40. The slider has a center rail 56, which supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
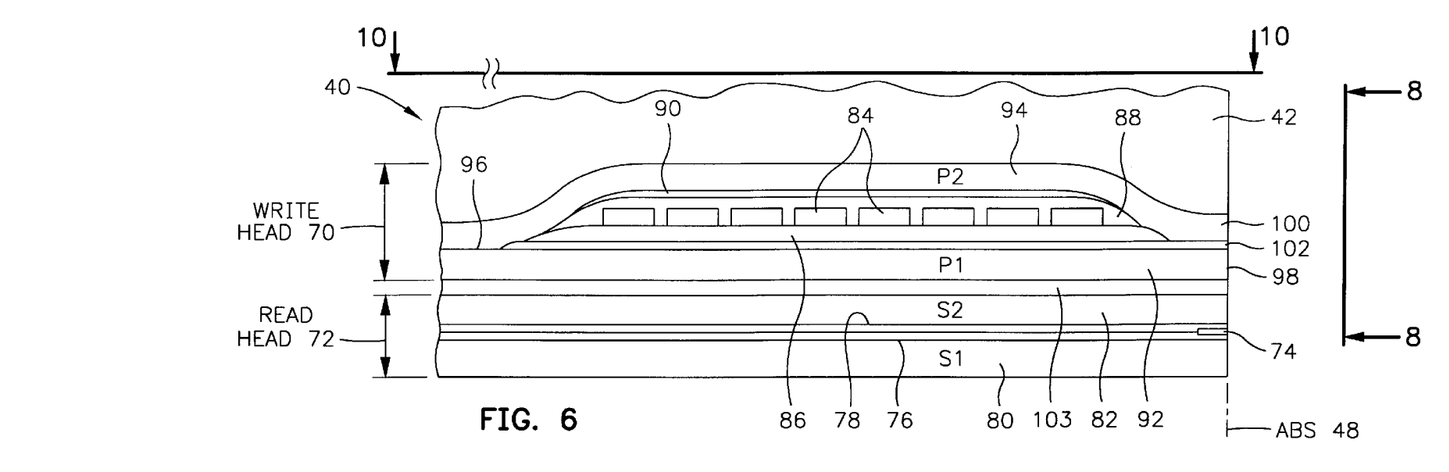
FIG. 6 is a partial view of the slider and a piggyback magnetic head as seen in plane 6—6 of FIG. 2.
Figure 8:
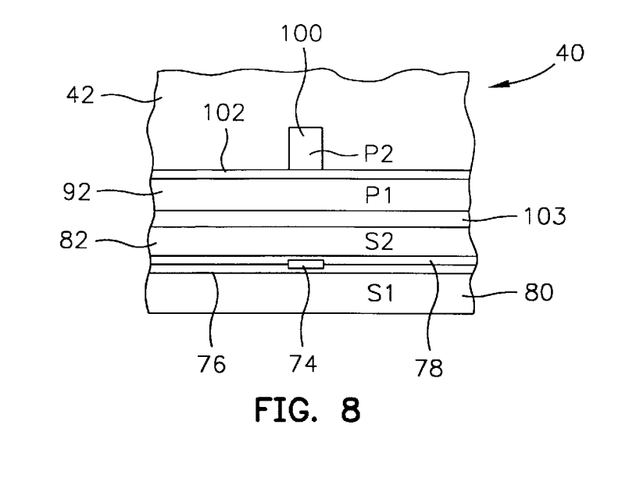
FIG. 8 is a partial ABS view of the slider taken along plane 8—8 of FIG. 6 to show the read and write elements of the piggyback magnetic head.

FIG. 6 is a side cross-sectional elevation view of a piggyback magnetic head 40, which includes a write head portion 70 and a read head portion 72, the read head portion employing a spin valve sensor 74 of the present invention. FIG. 8 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current $I_s$ conducted through the sensor causes these resistance changes to be manifested as potential changes. These potential changes are then processed as read back signals by the processing circuitry 50 shown in FIG. 3.

Figure 10:
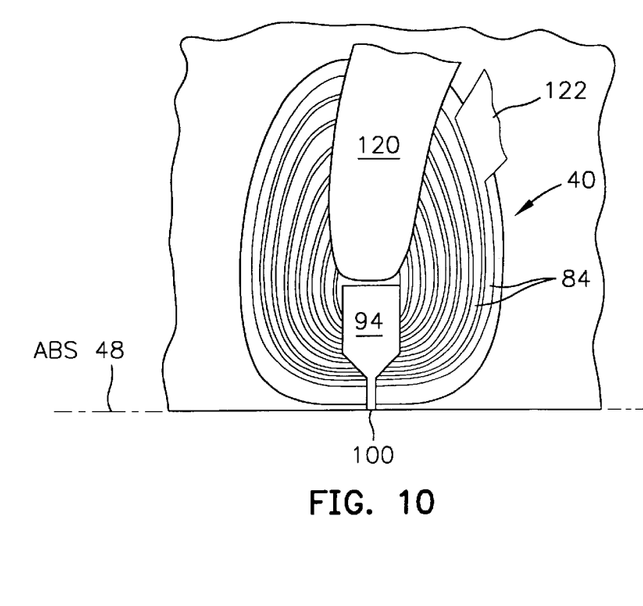
FIG. 10 is a view taken along plane 10—10 of FIGS. 6 or 7 with all material above the coil layer and leads removed.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 10) to leads 124 and 126 on the suspension.

Figure 7:
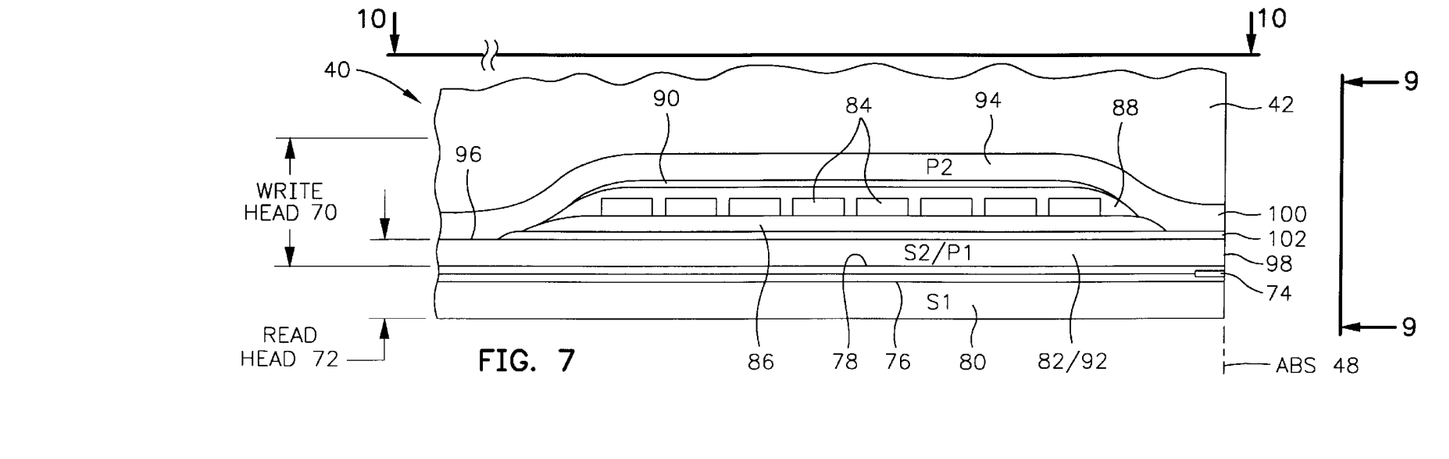
FIG. 7 is a partial view of the slider and a merged magnetic head as seen in plane 7—7 of FIG. 2.
Figure 9:
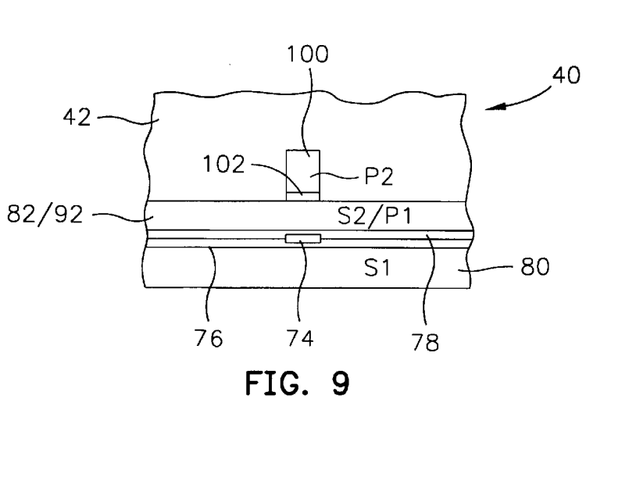
FIG. 9 is a partial ABS view of the slider taken along plane 9—9 of FIG. 7 to show the read and write elements of the merged magnetic head.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

Figure 11:
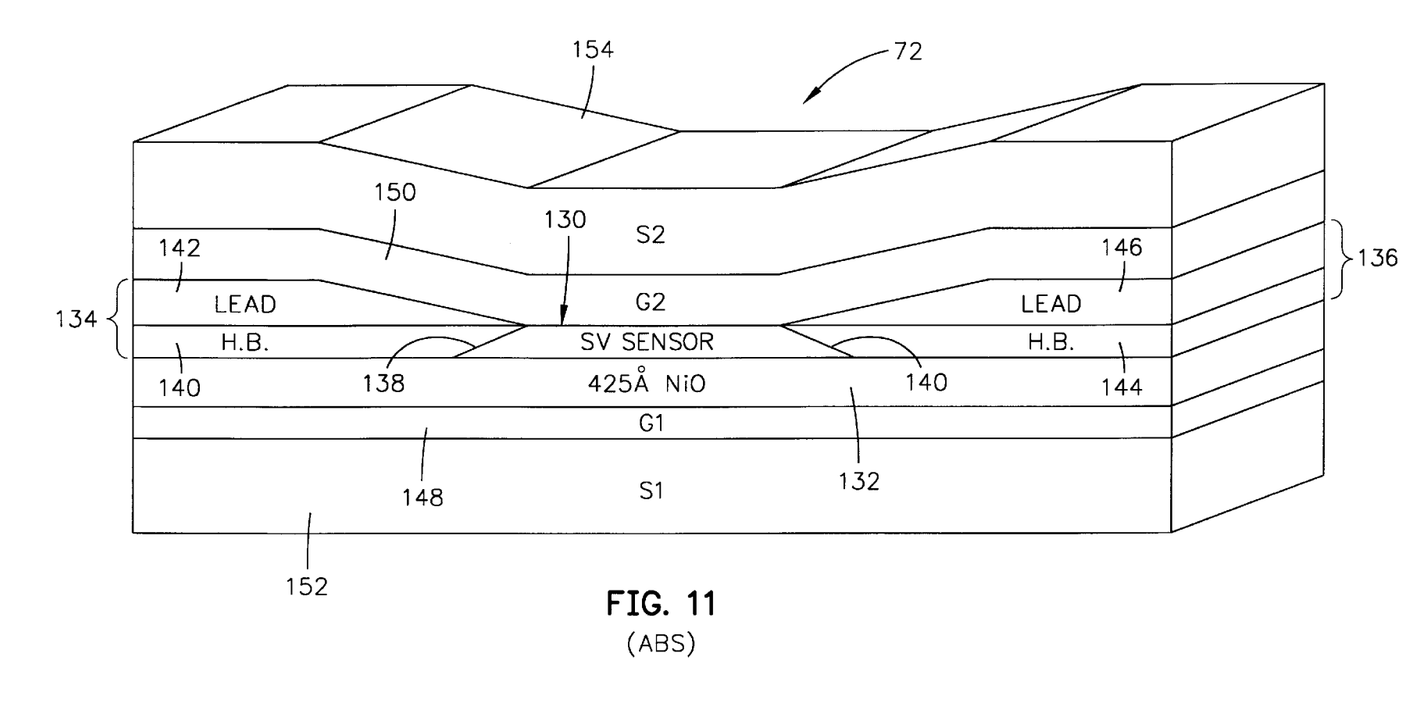
FIG. 11 is an isometric ABS illustration of a read head which employs a spin valve sensor longitudinally biased by hard biasing layers.

FIG. 11 is an isometric ABS illustration of a read head 72 which has a spin valve sensor 130. First and second hard bias and lead layers 134 and 136 are connected to first and second side edges 138 and 140 of the spin valve sensor. This connection is known in the art as a contiguous junction and is fully described in commonly assigned U.S. Pat. No. 5,018,037. The first hard bias and lead layers include a first hard bias layer 140 and a first lead layer 142 and the second hard bias and lead layers 136 include a second hard bias layer 144 and a second lead layer 146. The hard bias layers 140 and 144 cause magnetic flux to extend longitudinally through the spin valve sensor 130 for stabilizing magnetic domains of the free layer. The spin valve sensor 130 and the first and second hard bias and lead layers 134 and 136 are located between nonmagnetic electrically insulative first and second read gap layers 148 and 150. The first and second read gap layers 148 and 150 are, in turn, located between first and second shield layers 152 and 154.

EXAMPLE 1

Figure 12:
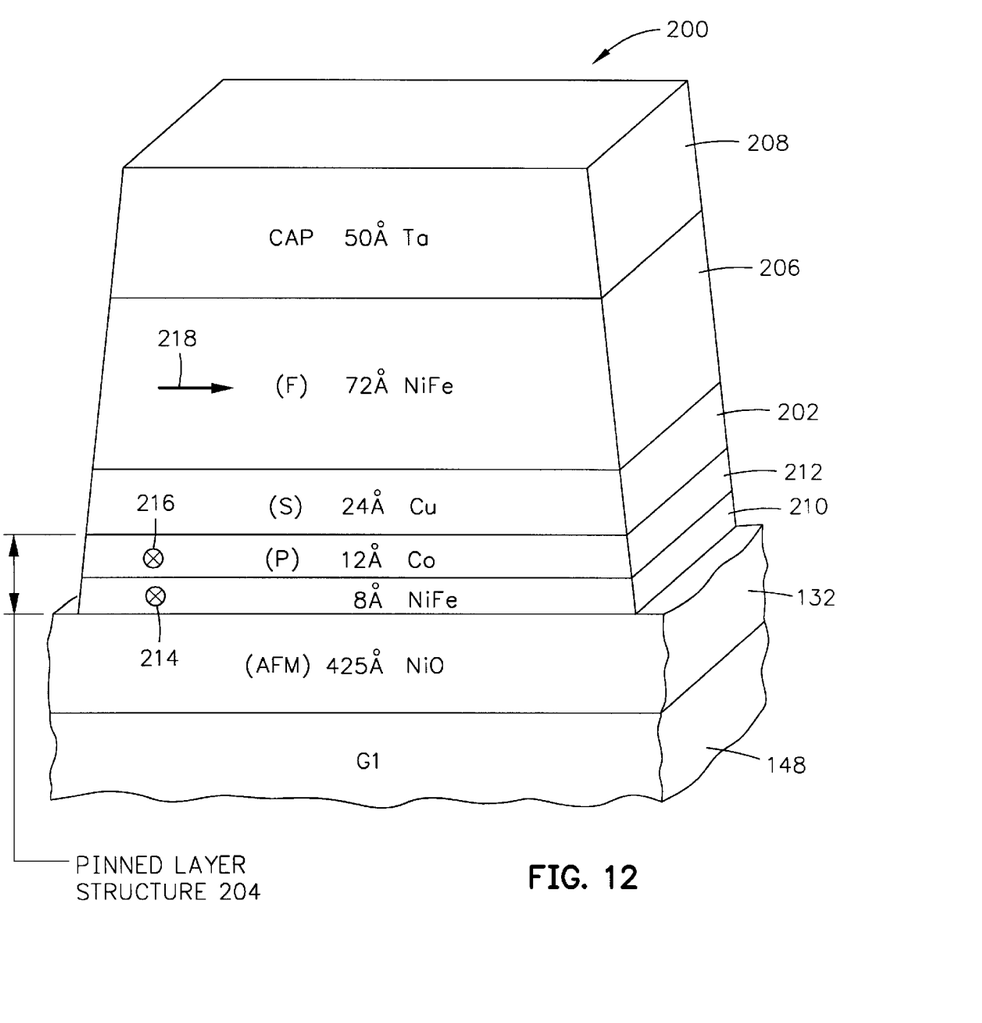
FIG. 12 is an isometric ABS illustration of an exemplary spin valve sensor.

In FIG. 12 there is shown a spin valve sensor 200 which includes the antiferromagnetic (AFM) nickel oxide (NiO) pinning layer 132, shown in FIG. 11. The pinning layer 132 is on the first gap layer (G1) 148, also shown in FIG. 11. The spin valve sensor 200 includes a nonmagnetic conductive spacer layer (S) 202 which is located between a ferromagnetic pinned layer structure 204 and a ferromagnetic free layer (F) 206. A cap layer 208 is on the free layer 206 to protect the free layer 206 from subsequent processing steps in the making of the read head. The pinned layer structure 204 includes a nickel iron (NiFe) first layer 210 and a cobalt (Co) second layer 212 with the first layer 210 being located between the pinning layer 132 and the second layer 212. The first layer 210 is exchange coupled to the pinning layer 132 so that a magnetic moment 214 of the first layer is directed perpendicular to the ABS, either toward or away from the ABS, as shown in FIG. 12. By exchange coupling between the layers 210 and 212 a magnetic moment 216 of the pinned layer 212 is directed parallel to the magnetic moment 214 perpendicular to and away from the ABS. The free layer 206 has a magnetic moment 218 which is directed parallel to the ABS and rotates upwardly or downwardly from that position in response to signal fields from a rotating magnetic disk. When the magnetic moment 218 is rotated upwardly in response to a signal field the resistance of the sensor 200 decreases and when the magnetic moment 218 rotates downwardly in response to a signal field, the resistance increases.

The thicknesses and materials of the layers of the spin valve sensor are 425 Å of nickel oxide (NiO) for the pinning layer 132, 8 Å of nickel iron (NiFe) for the first pinned layer 210, 12 Å of cobalt (Co) for the second pinned layer 212, 24

Å of copper (Cu) for the spacer layer 202, 72 Å of nickel iron (NiFe) for the free layer 206 and 50 Å of tantalum (Ta) for the cap layer 208. The spin valve sensor 200 was tested for its magnetoresistive coefficient (dr/R), resistance (R) and ferromagnetic coupling field ($H_F$) between the pinned layer structure 204 and the free layer 206. The magnetoresistive coefficient (dr/R) was 5.28%, the resistance (R) was 21 ohms/sq. and the ferromagnetic coupling field ($H_F$) was 2.5 Oe.

EXAMPLE 2

First Embodiment of the Invention

Figure 13:
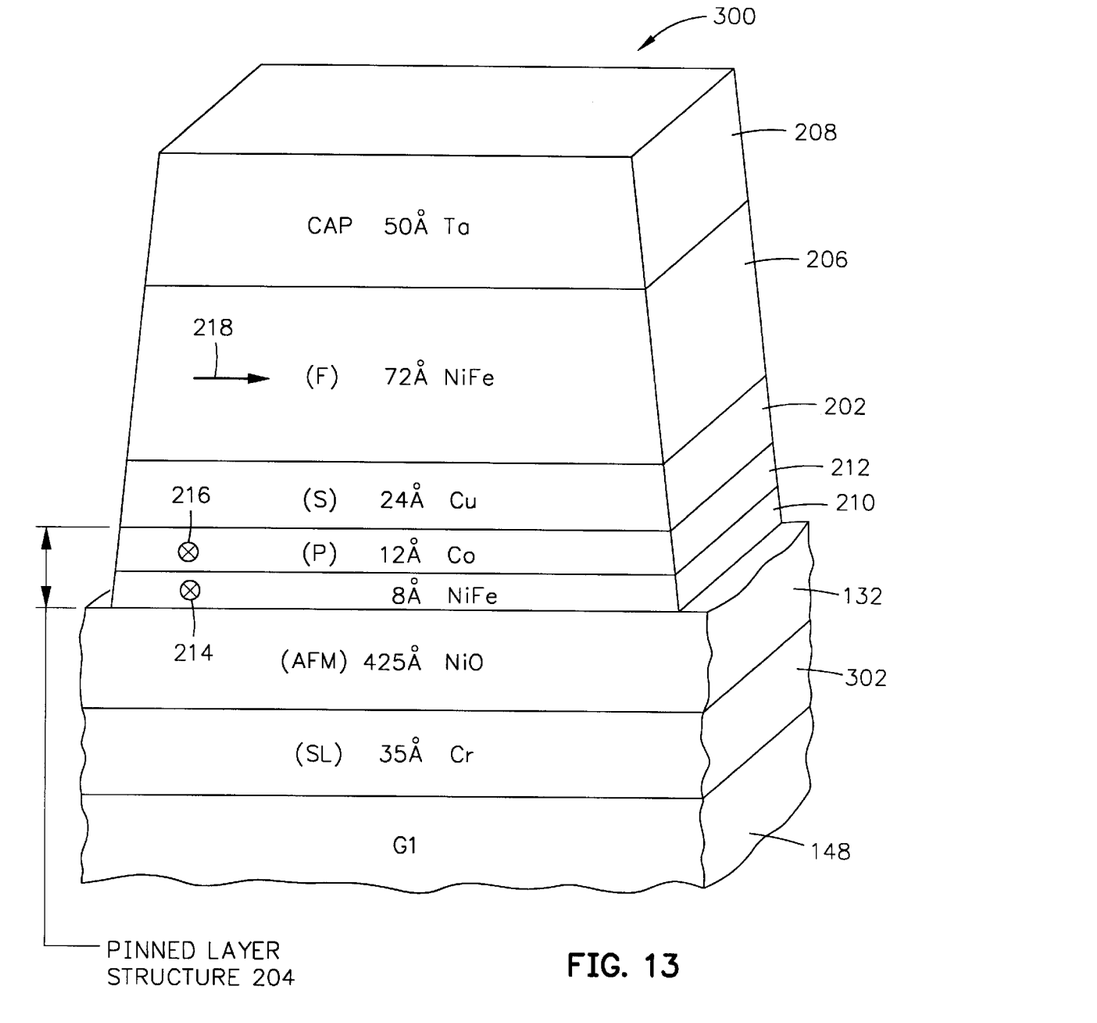
FIG. 13 is an isometric ABS illustration of a spin valve sensor which is a first embodiment of the present invention.

FIG. 13 illustrates a second example of a spin valve sensor 300 which is a first embodiment of the present invention. The spin valve sensor 300 is the same as the spin valve sensor 200 in FIG. 12 except for a seed layer (SL) 302 which is located between the first read gap layer 148 and the pinning layer 132. The seed layer 302 was 35 Å of chromium (Cr). The spin valve sensor 300 was also tested for magnetoresistive coefficient (dr/R), resistance (R) and ferromagnetic coupling field ($H_F$). The magnetoresistive coefficient (dr/R) was 5.9%, the resistance (R) was 18.1 ohms/sq. and the ferromagnetic coupling field ($H_F$) was 0.18 Oe. It can be seen from this testing that the seed layer 302 in FIG. 13 increased the magnetoresistive coefficient (dr/R) from 5.28% for the spin valve sensor 200 in FIG. 12 without the seed layer to 5.9% for the spin valve sensor 300 in FIG. 13 with the seed layer 302. This improvement was caused by an improved exchange coupling field between the pinning layer 132 and the pinned layer structure 204. It is believed that the seed layer 302 improved the microstructure of the pinning layer 132 which, in turn, caused the improvement of the exchange coupling between the pinning layer 132 and the pinned layer structure 204.

The resistance (R) of the spin valve sensor 300 in FIG. 13 decreased approximately 3 ohms/sq. from the resistance (R) of the spin valve sensor 200 in FIG. 12 which indicates that the seed layer 302 in FIG. 13 is shunting a portion of the sense current ($I_S$). Shunting of the sense current decreases the magnetoresistive coefficient (dr/R), however, the chromium (Cr) seed layer 302 in FIG. 13 overcame this reduction in magnetoresistive coefficient (dr/R) and exceeded the magnetoresistive coefficient (dr/R) of the spin valve sensor 200 shown in FIG. 12. The ferromagnetic coupling field ($H_F$) of the spin valve sensor 300 in FIG. 13 decreased in an excess of 2 Oe which is a desired improvement.

EXAMPLE 3

Second Embodiment of the Invention

Figure 14:
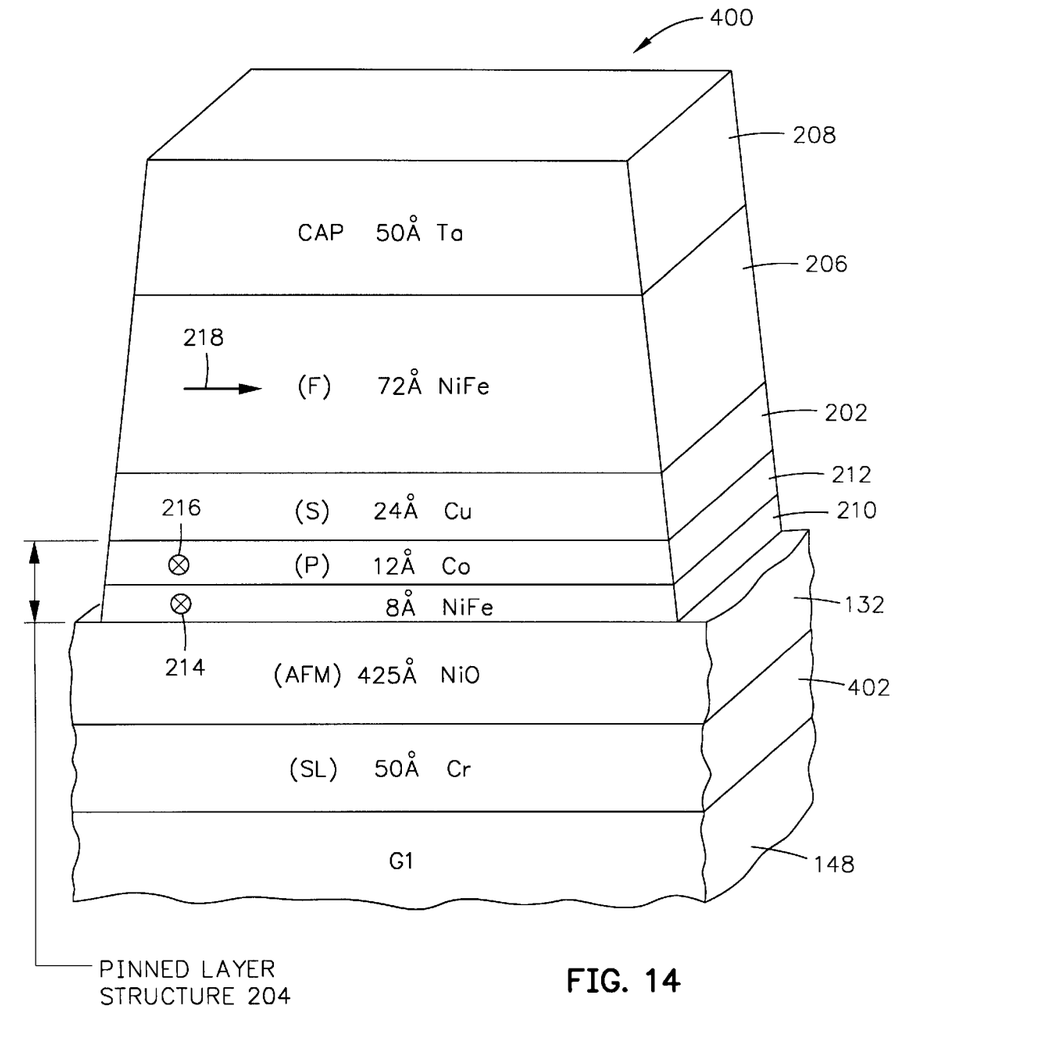
FIG. 14 is an isometric ABS illustration of a spin valve sensor which is a second embodiment of the present invention.

FIG. 14 illustrates a third example of a spin valve sensor 400 which is a second embodiment of the present invention. The spin valve sensor 400 is the same as the spin valve sensor 300 in FIG. 13 except for a seed layer (SL) 402 which is 50 Å of chromium (Cr) instead of 35 Å of chromium (Cr). The sensor 400 was tested for magnetoresistive coefficient (dr/R), resistance (R) and ferromagnetic coupling field ($H_F$). The magnetoresistive coefficient (dr/R) was 5.62%, the resistance (R) was 17.4 ohms/sq. and the ferromagnetic coupling field ($H_F$) was 1.5 Oe. It can be seen from this testing that the magnetoresistive coefficient (dr/R) of the spin valve sensor 400 with a thicker chromium (Cr) seed layer 402 than the chromium (Cr) seed layer 302 dropped from 5.9% for the spin valve sensor 300 in FIG. 13 to 5.62% for the spin valve sensor 400 in FIG. 14. This testing shows that an increase in the thickness of the chromium (Cr) seed layer can result in a decrease in the magnetoresistive coefficient (dr/R). It is believed that this is due to an increase in the shunting of the sense current ($I_s$) because of the increase in thickness of the chromium (Cr) seed layer 402 in FIG. 14. Accordingly, the thickness of the chromium (Cr) seed layer is preferably maintained below 50 Å. The resistance (R) of 17.4 ohms/sq. of the spin valve sensor 400 in FIG. 14 as compared to the resistance (R) of 18.1 ohms/sq. for the spin valve sensor 300 in FIG. 13 shows that the spin valve sensor 400 shunts more of the sense current through the seed layer 402 than the shunting of the sense current through the seed layer 302 in FIG. 13. The slight increase in ferromagnetic coupling field ($H_F$) of the spin valve sensor 400 compared to the ferromagnetic coupling field ($H_F$) for the spin valve sensor in 300 is minimal and acceptable for a well-performing spin valve sensor.

EXAMPLE 4

Third Embodiment of the Invention

Figure 15:
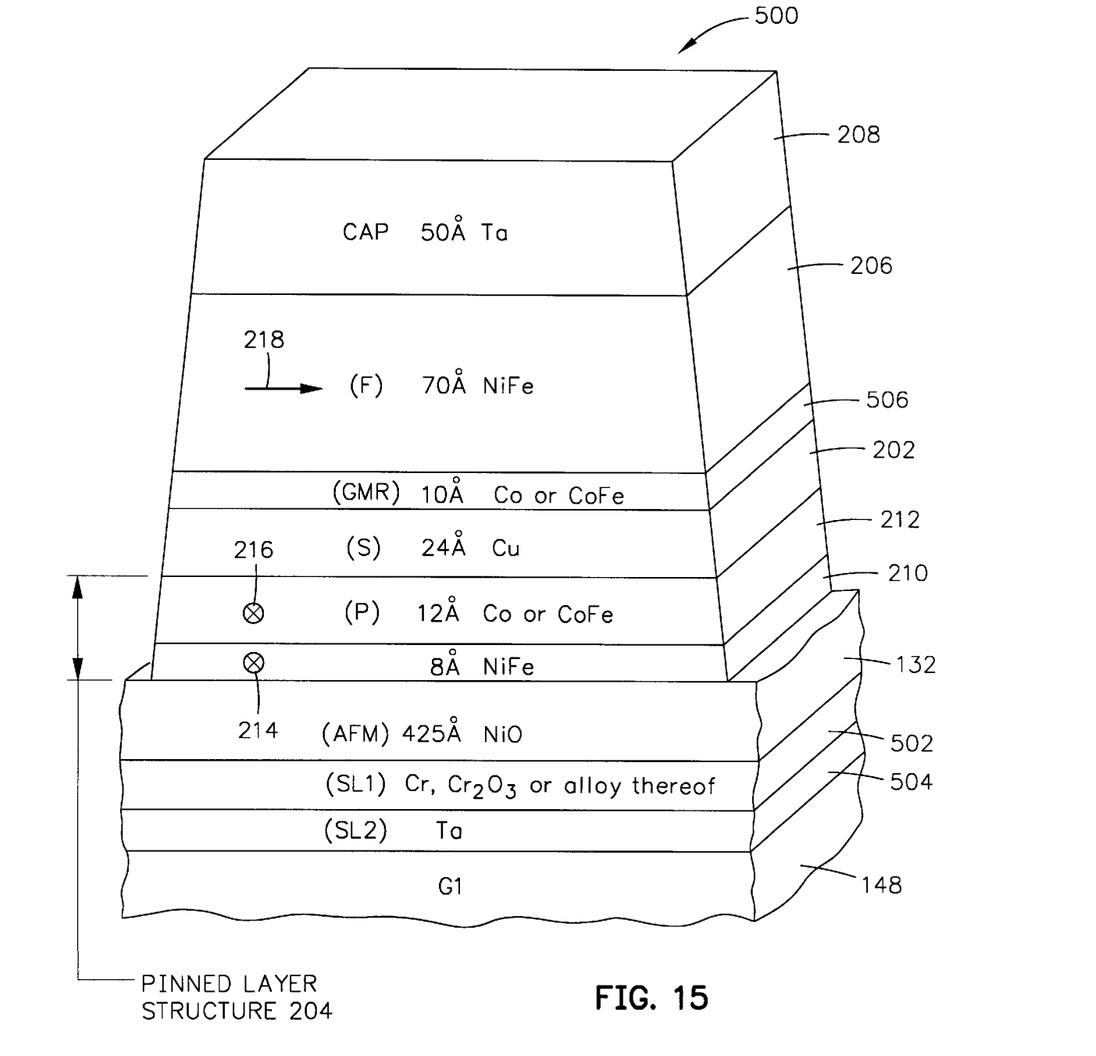
FIG. 15 is an isometric ABS illustration of a spin valve sensor which is a third embodiment of the present invention.

FIG. 15 illustrates a fourth example of a spin valve sensor 500 which is a third embodiment of the present invention. The spin valve sensor 500 is the same as the spin valve sensor 400 in FIG. 14 except for first and second seed layers (SL1) and (SL2) 502 and 504. The second seed layer 504 is located on the first read gap layer 148, the first seed layer 502 is located on the second seed layer 504 and the pinning layer 132 is located on the first seed layer 502. This embodiment of the invention shows the second seed layer 504 being tantalum (Ta) and the first seed layer 502 being chromium (Cr), chromium oxide ($Cr_2O_3$) or alloys thereof. For example, the first seed layer 502 may be chromium (Cr) or alloys of chromium (Cr), such as nickel chromium (NiCr) or nickel iron chromium (NiFeCr), or may be chromium oxide ($Cr_2O_3$) or alloys thereof, such as nickel chromium oxide (NiCrO) or nickel iron chromium oxide (NiFeCrO). The second seed layer 504 of tantalum (Ta) will improve the texture of the first seed layer 502, which will further improve the microstructure of the pinning layer 132. This will, in turn, increase the exchange coupling between the pinning layer 132 and the pinned layer structure 204, which results in a further increase in the magnetoresistive coefficient (dr/R). The spin valve sensor 500 in FIG. 15 further differs from the spin valve sensor 400 shown in FIG. 14 by including a giant magnetoresistive (GMR) enhancement layer 506 which is located between the spacer layer 202 and the free layer 206. The GMR enhancement layer 506 is preferably 10 Å of cobalt (Co) or cobalt iron (CoFe). It has been found that the GMR enhancement layer 506, which is sometimes referred to as a nanolayer, increases the magnetoresistive coefficient (dr/R) of the spin valve sensor.

EXAMPLE 5

Fourth Embodiment of the Invention

Figure 16:
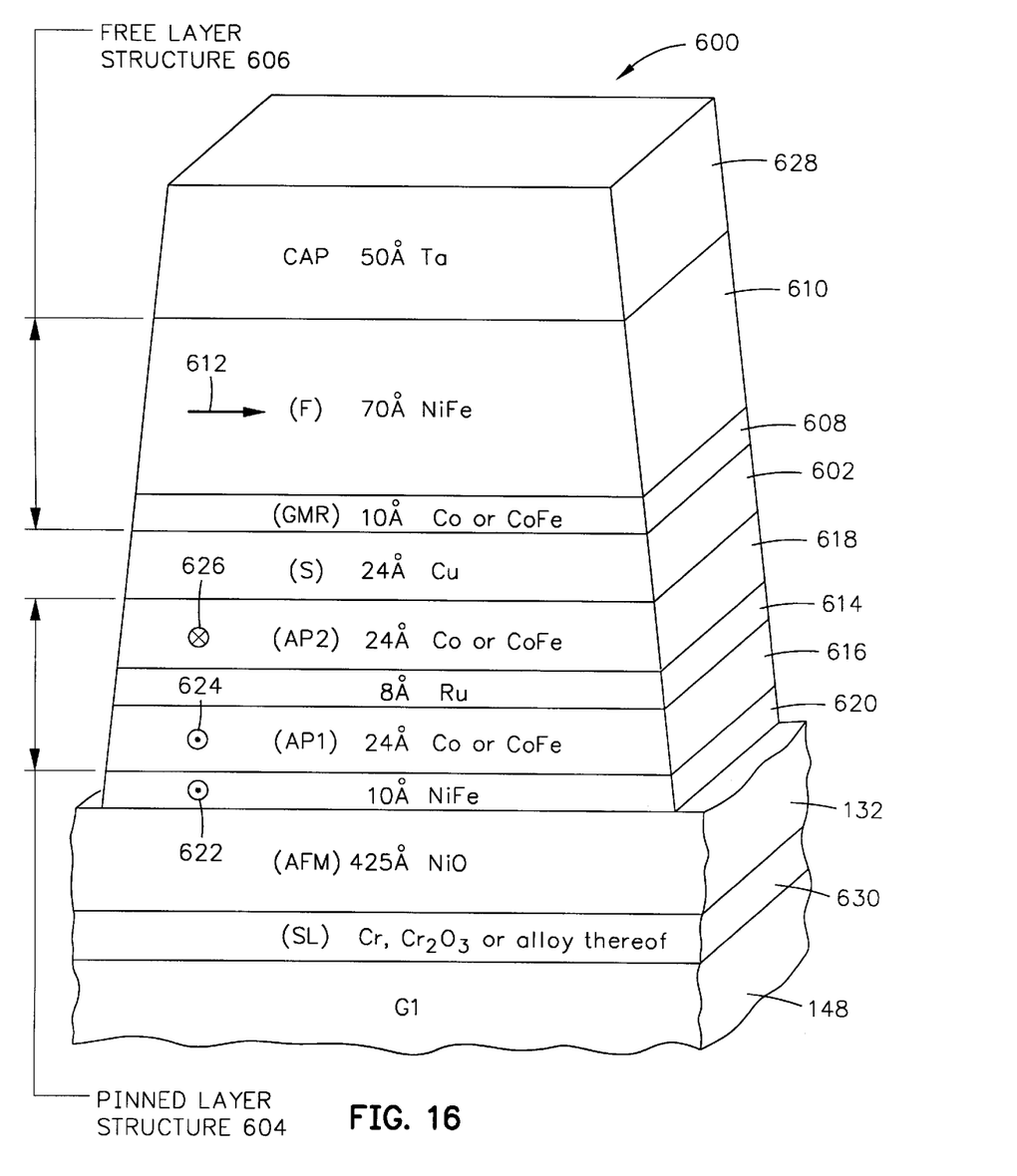
FIG. 16 is an isometric ABS illustration of a spin valve sensor which is a fourth embodiment of the present invention.

FIG. 16 illustrates a fifth example of a spin valve sensor 600 which is a fourth embodiment of the present invention. The spin valve sensor 600 includes a nonmagnetic conductive spacer layers 602 which is located between an antiparallel (AP) pinned layer structure 604 and a free layer structure 606. The free layer structure 606 includes a GMR layer 608 which is the same as the GMR layer 506 in FIG. 15 and a free layer (F) 610, the GMR layer 608 being located between the spacer layer 602 and the free layer 610. A magnetic moment 612 of the free layer 610 is directed parallel to the ABS, either from right to left or from left to right, as shown in FIG. 16. The GMR layer 608 has a magnetic moment (not shown) which is parallel to the magnetic moment 612.

The AP pinned layer structure 604 includes an antiparallel (AP) coupling layer 614 which is located between first and second antiparallel pinned layers (AP1) and (AP2) 616 and 618. The structure 604 further includes an interlayer of nickel iron (NiFe) 620 which is located between the pinning layer 132 and the first AP pinned layer 616. The nickel iron (NiFe) layer 620 is exchange coupled to the pinning layer 132 and has a magnetic moment 622 which is pinned by the pinning layer 132 in a direction perpendicular to the ABS, either away from or toward the ABS, as shown in FIG. 16. By exchange coupling with the layer 620 the first AP pinned layer 616 has a magnetic moment 624 which is directed parallel to the magnetic moment 622. By antiparallel coupling between the second AP pinned layer 618 and the first AP pinned layer 616 the second AP pinned layer 618 has a magnetic moment 626 which is directed antiparallel to the magnetic moment 624. When the magnetic moment 612 of the free layer 610 rotates upwardly from the ABS in response to a signal field the resistance of the spin valve sensor decreases and when the magnetic moment 612 rotates downwardly with respect to the ABS in response to a signal field the resistance of the spin valve sensor increases. A cap layer 628 is located on the free layer 610 for its protection from subsequent processing steps in the making of the read head.

The sensor 600 employs a seed layer 630, which is chromium (Cr), chromium oxide ($Cr_2O_3$) or an alloy thereof, between the first read gap layer 148 and the pinning layer 132. The seed layer (SL) 630 is the same as the seed layer 502 in FIG. 15 and has a thickness which is preferably less than 50 Å. Exemplary thicknesses and materials for the layers are 10 Å of nickel iron (NiFe) for the layer 620, 24 Å of cobalt (Co) or cobalt iron (CoFe) for the layer 616, 8 Å of ruthenium (Ru) for the layer 614, 24 Å of cobalt (Co) or cobalt iron (CoFe) for the layer 618, 24 Å of copper (Cu) for the layer 602, 10 Å of cobalt (Co) or cobalt iron (CoFe) for the GMR enhancement layer 608, 70 Å of nickel iron (NiFe) for the free layer 610 and 50 Å of tantalum (Ta) for the cap layer 628.

EXAMPLE 6

Fifth Embodiment of the Invention

Figure 17:
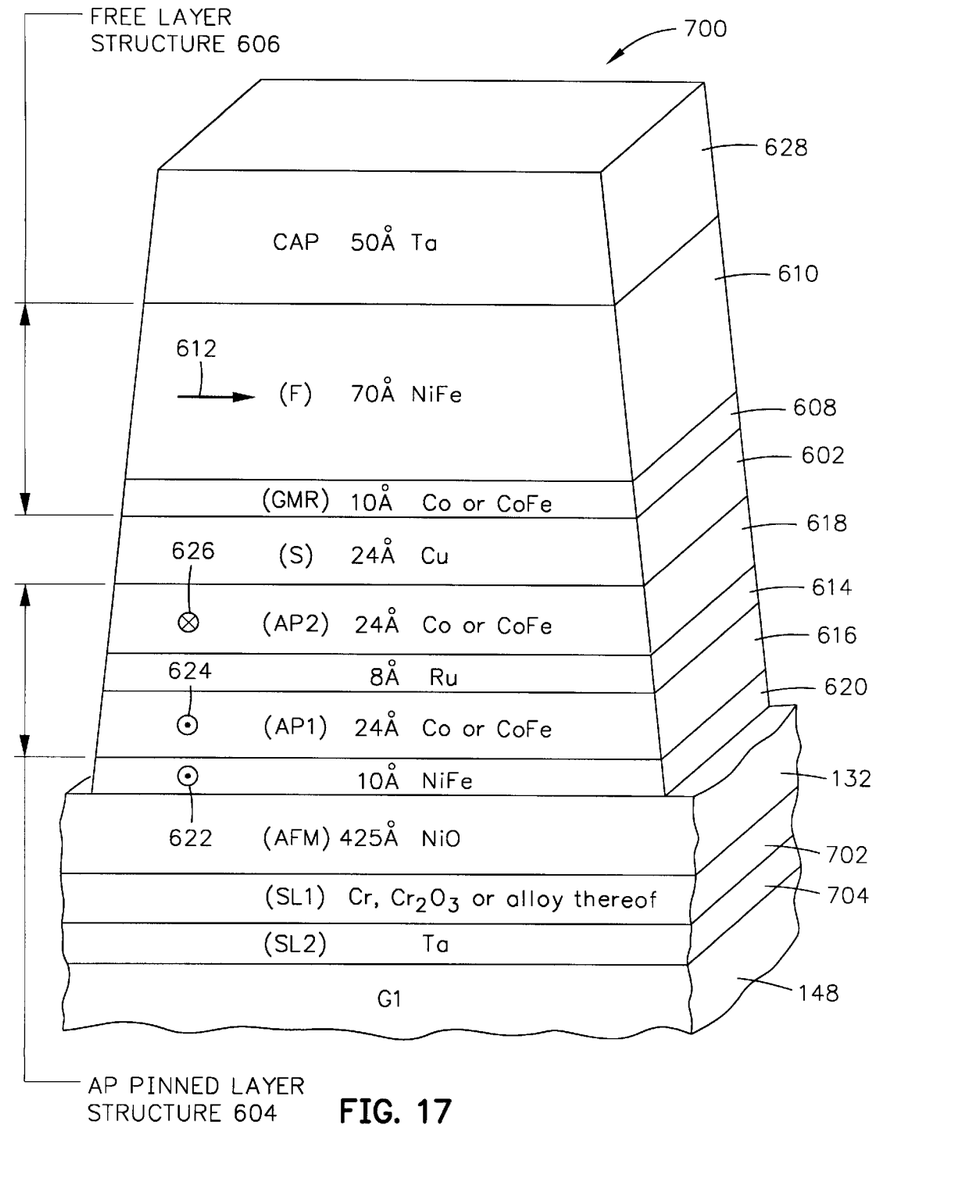
FIG. 17 is an isometric ABS illustration of a spin valve sensor which is a fifth embodiment of the present invention.

FIG. 17 is a sixth example of a spin valve sensor 700 which is a fifth embodiment of the present invention. The embodiment 700 in FIG. 17 is the same as the embodiment 600 in FIG. 16 except first and second seed layers (SL1) and (SL2) 702 and 704 are employed with the second seed layer 704 being on the first read gap layer 148, the first seed layer 702 being on the second seed layer 704 and the pinning layer 132 being on the first seed layer 702. The first seed layer 702 is the same as the seed layer 630 shown in FIG. 16. The second seed layer 704 is tantalum (Ta) which will improve the microstructure of the first seed layer 702 which will, in turn, improve the microstructure of the pinning layer 132. This will result in an improved exchange coupling between the pinning layer 132 and the AP pinned layer structure 604 which will further increase the magnetoresistive coefficient (dr/R).

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and the accompanying drawings.

I claim:

1. A magnetic read head, which includes a spin valve sensor, comprising:

the spin valve sensor including:
a ferromagnetic free layer having a magnetic moment;
a ferromagnetic pinned layer structure that has a magnetic moment;
a nickel oxide (NiO) pinning layer exchange coupled to the pinned layer structure for pinning the magnetic moment of the pinned layer structure;
a nonmagnetic conductive spacer layer located between the free layer and the pinned layer structure;
a first seed layer interfacing the pinning layer with the pinning layer being located between the first seed layer and the pinned layer structure; and
the first seed layer being selected from the group comprising chromium (Cr), a chromium (Cr) alloy, chromium oxide ($Cr_2O_3$), and a chromium oxide ($Cr_2O_3$) alloy.

2. A magnetic read head as claimed in claim 1 including:
the spin valve sensor having first and second side edges;
first and second hard bias and lead layers connected to the first and second side edges of the spin valve sensor;
nonmagnetic nonconductive first and second read gap layers;
the spin valve sensor and the first and second hard bias and lead layers being located between the first and second read gap layers;
ferromagnetic first and second shield layers; and
the first and second read gap layers being located between the first and second shield layers.

3. A magnetic read head as claimed in claim 2 wherein the first seed layer is chromium (Cr).

4. A magnetic read head as claimed in claim 3 wherein a thickness of the first seed layer is less than 50 Å.

5. A magnetic read head as claimed in claim 3 including:
a tantalum (Ta) second seed layer interfacing the first seed layer with the first seed layer being located between the tantalum (Ta) second seed layer and the pinning layer.

6. A magnetic read head as claimed in claim 2 wherein the pinned layer structure is an antiparallel (AP) pinned layer structure that includes:
ferromagnetic first and second antiparallel (AP) pinned layers with the first AP pinned layer interfacing the pinning layer; and
an antiparallel (AP) coupling layer located between the first and second AP layers.

7. A magnetic head assembly including a write head and a read head, the read head including a spin valve sensor, comprising:

the write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; and the read head including:
  a spin valve sensor with first and second side edges;
  first and second hard bias and lead layers connected to the first and second side edges of the spin valve sensor;
  nonmagnetic nonconductive first and second read gap layers;
  the spin valve sensor and the first and second hard bias and lead layers being located between the first and second read gap layers;
  a ferromagnetic first shield layer; and
  the first and second gap layers being located between the first shield layer and the first pole piece layer; and
the spin valve sensor including:
  a ferromagnetic free layer having a magnetic moment;
  a ferromagnetic pinned layer structure that has a magnetic moment;
  a nickel oxide (NiO) pinning layer exchange coupled to the pinned layer structure for pinning the magnetic moment of the pinned layer structure;
  a nonmagnetic conductive spacer layer located between the free layer and the pinned layer structure;
  a first seed layer interfacing the pinning layer with the pinning layer being located between the first seed layer and the pinned layer structure; and
  the first seed layer being selected from the group comprising chromium (Cr), a chromium (Cr) alloy, chromium oxide ($Cr_2O_3$), and a chromium oxide ($Cr_2O_3$) alloy.

8. A magnetic head assembly as claimed in claim 7 including:
  a ferromagnetic second shield layer;
  a nonmagnetic isolation layer located between the second shield layer and the first pole piece layer.

9. A magnetic head assembly as claimed in claim 7 wherein the first seed layer is chromium (Cr).

10. A magnetic head assembly as claimed in claim 9 wherein a thickness of the first seed layer is less than 50 Å.

11. A magnetic head assembly as claimed in claim 9 including:
  a tantalum (Ta) second seed layer interfacing the first seed layer with the first seed layer being located between the tantalum (Ta) second seed layer and the pinning layer.

12. A magnetic head assembly as claimed in claim 7 wherein the pinned layer structure is an antiparallel (AP) pinned layer structure that includes:
  ferromagnetic first and second antiparallel (AP) pinned layers with the first AP pinned layer interfacing the pinning layer; and
  an antiparallel (AP) coupling layer located between the first and second AP layers.

13. A magnetic disk drive including at least one magnetic head assembly that includes a write head and a read head, the read head including a spin valve sensor, comprising:
  the write head including:
    ferromagnetic first and second pole piece layers that have a yoke portion located between a pole tip portion and a back gap portion;
    a nonmagnetic write gap layer located between the pole tip portions of the first and second pole piece layers;
    an insulation stack with at least one coil layer embedded therein located between the yoke portions of the first and second pole piece layers; and
    the first and second pole piece layers being connected at their back gap portions; and
  the read head including:
    a spin valve sensor that has first and second side edges;
    first and second hard bias and lead layers connected to the first and second side edges of the spin valve sensor;
    nonmagnetic nonconductive first and second read gap layers;
    the spin valve sensor being located between the first and second read gap layers;
    a ferromagnetic first shield layer; and
    the first and second read gap layers being located between the first shield layer and the first pole piece layer; and
  the spin valve sensor including:
    a ferromagnetic free layer having a magnetic moment;
    a ferromagnetic pinned layer structure that has a magnetic moment;
    a nickel oxide (NiO) pinning layer exchange coupled to the pinned layer structure for pinning the magnetic moment of the pinned layer structure;
    a nonmagnetic conductive spacer layer located between the free layer and the pinned layer structure;
    a first seed layer interfacing the pinning layer with the pinning layer being located between the first seed layer and the pinned layer structure; and
    the seed layer being selected from the group comprising chromium (Cr), a chromium (Cr) alloy, chromium oxide ($Cr_2O_3$), and chromium oxide ($Cr_2O_3$) alloy; and
  a housing;
  a magnetic disk rotatably supported in the housing;
  a support mounted in the housing for supporting the magnetic head assembly with said ABS facing the magnetic disk so that the magnetic head assembly is in a transducing relationship with the magnetic disk;
  a spindle motor for rotating the magnetic disk;
  an actuator positioning means connected to the support for moving the magnetic head to multiple positions with respect to said magnetic disk; and
  a processor connected to the magnetic head, to the spindle motor and to the actuator for exchanging signals with the magnetic head, for controlling movement of the magnetic disk and for controlling the position of the magnetic head.

14. A magnetic disk drive as claimed in claim 13 including:
  a ferromagnetic second shield layer;
  a nonmagnetic isolation layer located between the second shield layer and the first pole piece layer.

15. A magnetic disk drive as claimed in claim 13 wherein the first seed layer is chromium (Cr).

16. A magnetic disk drive as claimed in claim 15 wherein a thickness of the first seed layer is less than 50 Å.

17. A magnetic disk drive as claimed in claim 15 including:
  a tantalum (Ta) second seed layer interfacing the first seed layer with the first seed layer being located between the tantalum (Ta) second seed layer and the pinning layer.

18. A magnetic disk drive as claimed in claim 13 wherein the pinned layer structure is an antiparallel (AP) pinned layer structure that includes:
  ferromagnetic first and second antiparallel (AP) pinned layers with the first AP pinned layer interfacing the pinning layer; and
  an antiparallel (AP) coupling layer located between the first and second AP layers.

19. A method of making a magnetic read that includes a spin valve sensor comprising the steps of:

making the spin valve sensor as follows:

forming a ferromagnetic free layer having a magnetic moment;

forming a ferromagnetic pinned layer structure that has a magnetic moment;

forming a nickel oxide (NiO) pinning layer exchange coupled to the pinned layer structure for pinning the magnetic moment of the pinned layer structure;

forming a nonmagnetic conductive spacer layer located between the free layer and the pinned layer structure;

forming a first seed layer interfacing the pinning layer with the pinning layer located between the first seed layer and the pinned layer structure; and selecting the first seed layer from the group comprising chromium (Cr), a chromium (Cr) alloy, chromium oxide ($Cr_2O_3$), and chromium oxide ($Cr_2O_3$) alloy.

20. A method as described in claim 19 including:

forming the spin valve sensor with first and second side edges;

forming first and second hard bias and lead layers connected to the first and second side edges of the spin valve sensor;

forming nonmagnetic nonconductive first and second read gap layers;

forming the spin valve sensor and the first and second hard bias and lead layers between the first and second read gap layers;

forming ferromagnetic first and second shield layers; and forming the first and second read gap layers between the first and second shield layers.

21. A method as described in claim 20 wherein the first seed layer is formed of chromium (Cr).

22. A method as described in claim 21 wherein the first seed layer is formed with a thickness less than 50 Å.

23. A method as described in claim 21 including:

forming a tantalum (Ta) second seed layer that interfaces the first seed layer with the first seed layer being located between the tantalum (Ta) second seed layer and the pinning layer.

24. A method as described in claim 20 wherein a forming of the pinned layer structure comprises the steps of:

forming ferromagnetic first and second antiparallel (AP) pinned layers with the first AP coupling layer being connected to the pinning layer; and forming an antiparallel (AP) coupling layer located between the first and second AP layers with the first AP pinned layer interfacing the pinning layer.

25. A method of making magnetic head assembly that includes a write head and a read head, comprising the steps of:

a making of the write head including:

forming ferromagnetic first and second pole piece layers in pole tip, yoke and back gap regions wherein the yoke region is located between the pole tip and back gap regions;

forming a nonmagnetic nonconductive write gap layer between the first and second pole piece layers in the pole tip region;

forming an insulation stack with at least one coil layer embedded therein between the first and second pole piece layers in the yoke region; and connecting the first and pole piece layers at said back gap region; and making the read head as follows:

forming the spin valve sensor with first and second side edges;

forming first and second hard bias and lead layers connected to the first and second side edges of the spin valve sensor;

forming nonmagnetic nonconductive first and second read gap layers;

forming the spin valve sensor and the first and second hard bias and lead layers between the first and second read gap layers;

forming a ferromagnetic first shield layer; and forming the first and second read gap layers between the first shield layer and the first pole piece layer; and a making of the spin valve sensor including:

forming a ferromagnetic free layer having a magnetic moment;

forming a ferromagnetic pinned layer structure that has a magnetic moment;

forming a nickel oxide (NiO) pinning layer exchange coupled to the pinned layer structure for pinning the magnetic moment of the pinned layer structure;

forming a nonmagnetic conductive spacer layer between the free layer and the pinned layer structure;

forming a first seed layer interfacing the pinning layer with the pinning layer located between the first seed layer and the pinned layer structure; and selecting the first seed layer from the group comprising chromium (Cr), a chromium (Cr) alloy, chromium oxide ($Cr_2O_3$), and chromium oxide ($Cr_2O_3$) alloy.

26. A method as described in claim 25 including:

forming a ferromagnetic second shield layer;

forming a nonmagnetic isolation layer between the second shield layer and the first pole piece layer.

27. A method as described in claim 25 wherein the first seed layer is formed of chromium (Cr).

28. A method as described in claim 27 wherein the first seed layer is formed with a thickness less than 50 Å.

29. A method as described in claim 27 including:

forming a tantalum (Ta) second seed layer that interfaces the first seed layer with the first seed layer being located between the tantalum (Ta) second seed layer and the pinning layer.

30. A method as described in claim 25 wherein a forming of the pinned layer structure comprises the steps of:

forming ferromagnetic first and second antiparallel (AP) pinned layers with the first AP coupling layer being connected to the pinning layer; and forming an antiparallel (AP) coupling layer located between the first and second AP layers with the first AP pinned layer interfacing the pinning layer.

\* \* \* \* \*